United States Patent
Kobayashi et al.

(10) Patent No.: US 8,955,225 B2
(45) Date of Patent: Feb. 17, 2015

(54) METHOD FOR PRODUCING AN ACTUATOR

(75) Inventors: Masato Kobayashi, Fujisawa (JP); Tomoharu Saito, Fujisawa (JP); Shinji Fujita, Fujisawa (JP); Takanori Tanaka, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/581,174

(22) PCT Filed: Nov. 14, 2011

(86) PCT No.: PCT/JP2011/006351
§ 371 (c)(1),
(2), (4) Date: Aug. 24, 2012

(87) PCT Pub. No.: WO2012/063499
PCT Pub. Date: May 18, 2012

(65) Prior Publication Data
US 2013/0255418 A1  Oct. 3, 2013

(30) Foreign Application Priority Data

| | | |
|---|---|---|
| Nov. 12, 2010 | (JP) | 2010-254192 |
| Nov. 16, 2010 | (JP) | 2010-256265 |
| Nov. 16, 2010 | (JP) | 2010-256266 |
| Nov. 16, 2010 | (JP) | 2010-256267 |
| Feb. 14, 2011 | (JP) | 2011-028753 |
| Aug. 4, 2011 | (JP) | 2011-170758 |
| Aug. 4, 2011 | (JP) | 2011-170762 |
| Aug. 4, 2011 | (JP) | 2011-170771 |
| Aug. 4, 2011 | (JP) | 2011-170782 |

(51) Int. Cl.
*B21D 53/10* (2006.01)
*C21D 7/06* (2006.01)
(Continued)

(52) U.S. Cl.
CPC *F16H 25/22* (2013.01); *B24C 1/04* (2013.01); *B24C 1/10* (2013.01); *B24C 11/00* (2013.01);
(Continued)

(58) Field of Classification Search
CPC ............ F16H 25/22; B24C 1/04; B24C 11/00; B24C 1/10; F16C 33/366; F16C 33/6651; F16C 19/364; F16C 2223/08
USPC ............. 29/90.7, 90.01, 898, 898.12, 898.13; 72/53; 384/625; 451/37, 38
See application file for complete search history.

(56) References Cited

U.S. PATENT DOCUMENTS 5,592,840 A * 1/1997 Miyasaka .................. 72/53
6,817,768 B2 11/2004 Matsuyama et al.
(Continued)

FOREIGN PATENT DOCUMENTS

| JP | 5-241235 A | 9/1993 |
| JP | 7-42746 A | 2/1995 |

(Continued)

OTHER PUBLICATIONS

Machine Translation of JP 2008-298144 A.*
(Continued)

*Primary Examiner* — Sarang Afzali
(74) *Attorney, Agent, or Firm* — Crowell & Moring LLP

(57) ABSTRACT

In forming an actuator, a large end surface of a tapered roller of a tapered roller bearing is shot with minute particles of silicon carbide having a diameter of 0.5 to 100 μm and having an angle formed by crushing, and such a surface is scraped concavely at a diameter within a range from 0.5 to 100 μm to form a large number of concavities having a depth of equal to or greater than 1 μm at a pitch of equal to or less than 200 μm. The concavities are non-continuous and isolated from each other, and serve as a lubricant puddle. The concavities are formed by scraping and not by plastic deformation, and thus the surface is not hardened.

4 Claims, 6 Drawing Sheets

(51) Int. Cl.

| | | |
|---|---|---|
| *F16C 33/02* | (2006.01) | |
| *F16H 25/22* | (2006.01) | |
| *B24C 1/04* | (2006.01) | |
| *B24C 1/10* | (2006.01) | |
| *B24C 11/00* | (2006.01) | |
| *F16C 33/66* | (2006.01) | |
| *F16C 19/36* | (2006.01) | |
| *F16C 33/36* | (2006.01) | |

(52) U.S. Cl.
CPC .......... *F16C 33/6651* (2013.01); *F16C 19/364* (2013.01); *F16C 33/366* (2013.01); *F16C 2223/08* (2013.01)
USPC ........ 29/898.13; 29/898; 29/898.12; 29/90.7; 72/53; 384/625; 451/38

(56) References Cited

U.S. PATENT DOCUMENTS

| | | | |
|---|---|---|---|
| 7,204,892 B2 * | 4/2007 | Ishii et al. ............... | 148/318 |
| 7,481,088 B2 * | 1/2009 | Bayer et al. ............. | 72/53 |
| 8,197,146 B2 | 6/2012 | Tsujimoto et al. | |
| 8,632,256 B2 * | 1/2014 | Katayama et al. ........... | 384/564 |

| | | |
|---|---|---|
| 2007/0258672 A1 | 11/2007 | Tsujimoto et al. |
| 2008/0193069 A1 | 8/2008 | Tsujimoto et al. |
| 2009/0092796 A1 | 4/2009 | Ishida et al. |
| 2010/0187051 A1 | 7/2010 | Katayama et al. |

FOREIGN PATENT DOCUMENTS

| | | |
|---|---|---|
| JP | 2001-3941 A | 1/2001 |
| JP | 2003-269468 A | 9/2003 |
| JP | 2006-9962 A | 1/2006 |
| JP | 2006-9963 A | 1/2006 |
| JP | 2006-9964 A | 1/2006 |
| JP | 2008-256197 A | 10/2008 |
| JP | 2008-298144 A | 12/2008 |
| JP | 2009-24711 A | 2/2009 |
| JP | 2009-526126 A | 7/2009 |
| JP | 2010-169182 A | 8/2010 |

OTHER PUBLICATIONS

Machine Translation of JP 2010-169182 A.*
English Translation of International Preliminary Report on Patentability (PCT/ID/273) Dated May 23, 2013 including PCT/ISA/237 (Eight (8) pages).
International Search Report dated Feb. 14, 2012 (two (2) pages).

* cited by examiner

FIG. 3
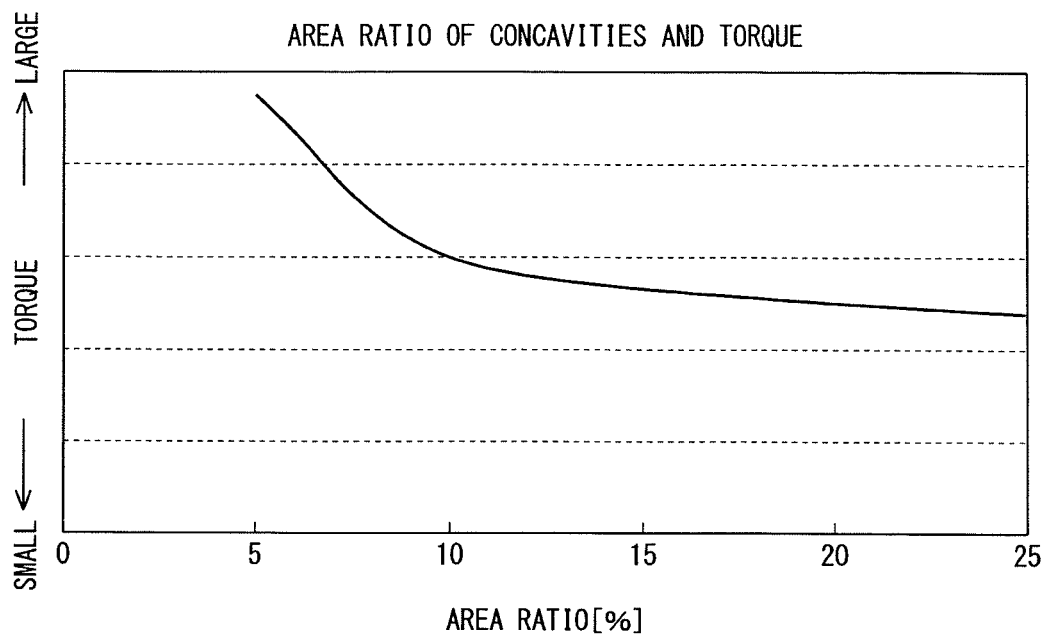
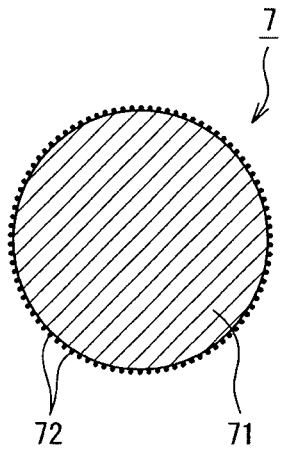
FIG. 4A
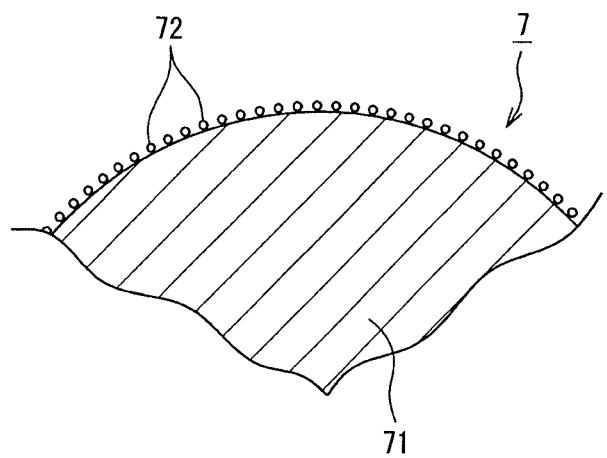
FIG. 4B

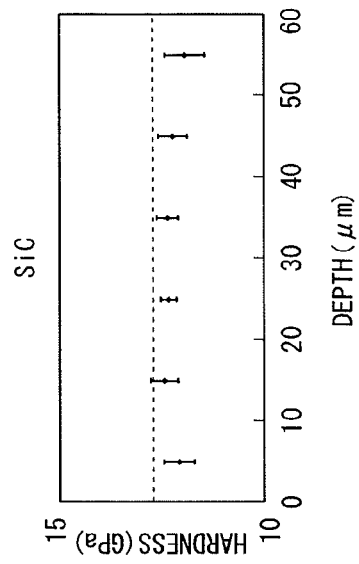
FIG. 9A UNPROCESSED
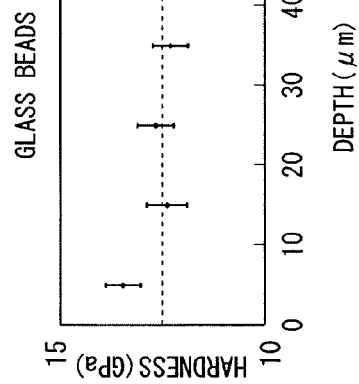
FIG. 9B GLASS BEADS
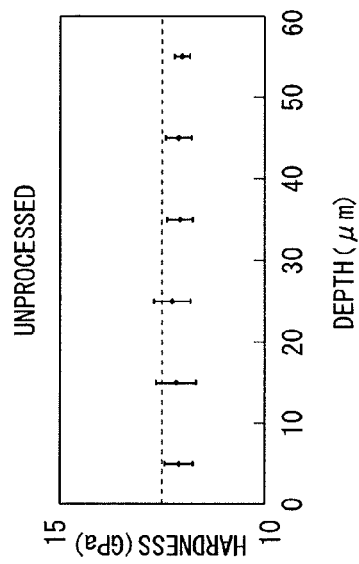
FIG. 9C SiC

METHOD FOR PRODUCING AN ACTUATOR

TECHNICAL FIELD

The present invention relates to an actuator and a method for producing the same. The term, actuator is a collective name of devices including a rolling element and two components relatively moving to each other via the rolling element. Hence, the actuator includes a bearing configured by a rolling element and two bearing rings sandwiching the rolling element, a linear guide configured by a rolling element, a guide rail and a slider which relatively move to each other via the rolling element, and a ball screw configured by a rolling element, a screw shaft and a nut which relatively move to each other via the rolling element. Moreover, such a rolling element includes various rolling elements, such as a cylindrical roller, a tapered roller, a needle roller, and a ball.

In consideration of the above-explained definitions, the actuator of the present invention can be translated as a device including a rolling element and two components relatively moving to each other via the rolling element, and the title of the present invention can be translated as a bearing, linear guide, or ball screw when the application of the present invention is limited to such a bearing, linear guide, or a ball screw.

BACKGROUND ART

Conventionally, in the fields where a roller bearing and other actuators are applied, such as a differential of an automobile and a transmission thereof, miniaturization and accomplishment of a high output are advancing. Hence, the environment of the usage of such an actuator tends to be a high-load condition and a high-temperature condition where the viscosity of a lubricant becomes low. Accordingly, the lubrication condition of the actuator like a bearing is changing to be more strict than ever, and a worn-out and a surface delamination due to improper lubrication become more likely to occur.

In order to improve such a lubrication condition, a technology is proposed which forms a lubricant puddle in a surface of at least either one of a rolling element and two components relatively moving, via the rolling element, to each other which is subjected to a relative rolling contact or sliding contact.

For example, Patent Document 1 discloses a technology of performing shot blasting on the flange face of an inner race to form concavities and convexities. Moreover, Patent Document 2 discloses a technology of forming a large number of minute recesses each formed of a concavity in the sliding surface of a sliding component by blasting with blast particles. Furthermore, Patent Document 3 discloses a technology of finishing the end surface or the flange face of a roller by a grindstone to form a finished surface including a gentle smoothed surface and recesses formed at random in the smoothed surface.

Still further, Patent Documents 4 to 6 disclose technologies of forming a large number of recesses of minute concavities at random in the rolling contact surface of a rolling element and the end surface thereof, the raceway surfaces of the inner and outer races and the large flange face of the inner race. According to those technologies, the lifetime of a roller bearing can be extended when the surface roughness parameter Ryni of the surface where the recesses are provided is set to be 0.4 to 1.0 μm, Rymax is set to be 0.4 to 1.0 μm, an Sk value indicating the distortion level of a roughness curvature is set to be equal to or smaller than −1.6, the ratio of recessed area is set to be 5 to 20%, and an average area is set to be 30 to 100 μm$^2$.

Yet further, Patent Document 7 discloses a technology of causing a large number of recesses to be dispersingly present at random in a roller end surface, setting the arithmetic mean roughness Sa among the three-dimensional surface roughness parameters to be equal to or smaller than 0.1 μm, and setting the damping recess roughness Svk to be 0.15 to 0.30 μm, thereby improving the anti-seizing properties.

PRIOR ART DOCUMENTS

Patent Documents
Patent Document 1: JP Hei5-241235A
Patent Document 2: JP 2009-526126A
Patent Document 3: JP Hei7-42746A
Patent Document 4: JP 2006-9962A
Patent Document 5: JP 2006-9963A
Patent Document 6: JP 2006-9964A
Patent Document 7: JP 2003-269468A

SUMMARY OF THE INVENTION

Problem to be Solved

All of the above-identified Patent Documents are, however, to hit a surface subjected to rolling contact or sliding contact with minute particles in a spherical shape, etc., crush up such a surface and make dents in such a surface to cause plastic deformation, thereby forming minute concavities. Hence, such a surface is inevitably subjected to work hardening at the concavities and the peripheries therearound due to the plastic deformation.

When a counterpart component moves over the surfaces of the concavities, the concavities should perform elastic deformation and be temporarily collapsed by the counterpart component. However, if the concavities as the lubricant puddle and the peripheries therearound are hardened as explained above, the collapsed level of the concavities is little or the concavities are hardly collapsed. In this case, the lubricant pooled in the concavities is not discharged to the above-explained contacting surface from the concavities, or even if the lubricant is discharged, the amount of the discharged lubricant becomes small. This results in the lack of lubricant on the above-explained surface subjected to rolling contact or sliding contact.

Hence, the present invention has been made to address the above-explained technical issue, and it is an object of the present invention to provide an actuator and a method for manufacturing the same which have a high lubrication performance, and thus reducing a frictional resistance.

Solution to the Problem

To address the above-explained technical issue, a first aspect of the present invention provides an actuator that includes: a rolling element; and two components that relatively move to each other via the rolling element. A large number of independent concavities each having a diameter within a range from 0.5 to 100 μm are formed in at least either one surface of two surfaces subjected to rolling contact or sliding contact with each other by scraping the one surface concavely, and the concavities serve as a lubricant puddle. The surfaces subjected to rolling contact with each other include, when the actuator is a bearing, the rolling surface of a roller or the external surface of a ball and a raceway surface contacting those. When the actuator is a liner guide, the raceway surface of a roller or the external surface of a ball and the raceway surface of a guide rail or a slider contacting those are included. When the actuator is a ball screw, the external surface of a ball and respective threaded grooves of a screw shaft and a nut are included. The surfaces subjected to sliding contact with each other include, in the case of a bearing using a roller, the end face of the roller and the flange surface of a bearing ring contacting that end face. The surfaces subjected to sliding contact with each other include, in the case of a liner guide using a roller, the end face of the roller and a counterpart surface contacting that end face. According to the present invention and the embodiments thereof, a radial dimension means a diameter as long as there is a note.

According to a second aspect of the present invention, convexities formed at respective edges of the concavities are polished by a grindstone. According to a third aspect of the present invention, the convexities are likewise polished by barrel polishing. According to a fourth aspect of the present invention, the convexities are polished by elastic colliding materials each including a rubber elastic material and hard particles firmly bonded to an outer circumference of the rubber elastic material.

According to a fifth aspect of the present invention, a pitch of the concavities having a depth of equal to or greater than 1 μm is equal to or smaller than 200 μm, and the concavities are non-continuous from each other and are isolated from each other. Accordingly, the lubrication performance is enhanced, and the load acceptance capacity can be maintained.

According to a sixth aspect of the present invention, a ratio of a total area of the large number of concavities formed by scraping relative to an area of the surface where the concavities are formed is set to be in a range from equal to or greater than 10% and to equal to or smaller than 40%. More preferably, the area ratio is set to be from equal to or greater than 15% and to equal to or smaller than 30%. In order to enhance the lubrication performance (i.e., reduction of the torque in the case of a rotating actuator), it is appropriate if the upper limit of the area ratio is large, but it is preferable that the upper limit should be small in order to maintain the load acceptance capacity of the actuator. Hence, the area ratio is set to be the above-explained range to enhance the lubrication performance, while at the same time, to maintain the load acceptance capacity.

According to a seventh aspect of the present invention, three-dimensional roughness of Sa (arithmetic mean roughness) is set to be equal to or greater than 0.1 μm, and Rsk (skewness: deviation of surface height distribution) is set to be equal to or greater than −1.

An eight aspect of the present invention provides a method for producing an actuator that comprises a rolling element and two components which relatively move to each other via the rolling element, the method includes: shooting at least either one surface of two surfaces subjected to rolling contact or sliding contact with each other with minute particles formed of a harder material than a material of the one surface and each having an angle on a surface of each minute particle to scrape at least the one surface concavely to form a large number of independent concavities each having a diameter of 0.5 to 100 μm and serving as a lubricant puddle.

According to a ninth aspect of the present invention, minute convexities formed at respective edges of the concavities are removed by grindstone polishing. According to a tenth aspect of the present invention, in the removal according to the ninth aspect of the present invention, a large number of components where the concavities are formed among the rolling element and the two components relatively moving to each other via the rolling element are set to a holder, respective components set to the holder are successively shot with the minute particles to form the large number of the concavities in a surface of each component, the surfaces where the concavities are formed are successively polished by a grindstone with the large number of the component being set to the holder to remove the minute convexities.

According to an eleventh aspect of the present invention, in the production of the actuator, the minute convexities are removed by barrel polishing. According to a twelfth aspect of the present invention, the removal is performed by causing the surface to be collided with elastic colliding materials each including a rubber elastic material and hard particles firmly bonded to an outer circumference of the rubber elastic material. According to a thirteenth aspect of the present invention, the elastic colliding materials of the twelfth aspect are each formed of a spherical rubber elastic material and a large number of hard particles firmly bonded to an outer circumference of the rubber elastic material by a bond, and the surface concavely scraped is shot with the large number of elastic colliding materials to polish and remove the convexities.

According to a fourteenth aspect of the present invention, a diameter of each of the minute particles used to form the concavities in the production of the actuator is from 0.5 to 100 μm. According to a fifteenth aspect of the present invention, as the minute particles used in the fourteenth aspect, the hard material is crushed to form the minute particles each having an angle on a surface of the minute particle, and at least the one surface is scraped by respective angles of the minute particles to form the concavities. According to a sixteenth aspect, the minute particles are used as a shot material, and at least the one surface is scraped by shot blasting.

A seventeenth aspect of the present invention provides another method for producing an actuator which comprises an inner race including a raceway surface, an outer race including a raceway surface facing with the raceway surface of the inner race, and a plurality of rollers disposed between both raceway surfaces in a freely rollable manner, the method includes: a first process of performing a shot work of causing at least one of the inner race, the outer race, and the rolling element to be collided with particles each having at least one angle to form circular concavities in an entire surface of a work target by collision and convexities formed of an excess metal; and a second process of removing apart of each convexity to make the convexities smaller. The actuator produced through this method includes the inner race, the outer race, and the plurality of rollers, and thus the specific example is a roller bearing.

According to an eighteenth aspect of the present invention, in the actuator producing method of the seventeenth aspect, the second process is to cause the component having undergone the shot work among the inner race, the outer race, and the rolling element to be collided with elastic particles each including a plurality of hard particles attached to a surface of each elastic particle. According to a nineteenth aspect, the actuator producing method in the seventeenth or eighteenth aspect further includes a third process of polishing a surface having undergone the shot work among the raceway surface of the inner race, the raceway surface of the outer race, and a rolling surface of the rolling element to remove the convexities made smaller and to make the surface flat, and to leave the concavities only.

A twentieth aspect provides another actuator that includes: an inner race including a raceway surface; an outer race including a raceway surface facing the raceway surface of the inner race; and a plurality of rollers disposed between both raceway surfaces in a freely rollable manner. Circular concavities are formed in an entire surface of at least one of the inner race, the outer race, and the rolling element by causing the surface to be collided with particles each having at least one angle, and concavities having a depth of equal to or greater than 1 μm among the concavities are uniformly disposed at a pitch of equal to or smaller than 200 μm.

According to a twenty-first aspect, the component formed with the concavities among the inner race, the outer race, and the rolling element of the twentieth aspect includes a portion that is a flat surface other than the concavities among the raceway surface of the inner race, the raceway surface of the outer race, and a rolling surface of the rolling element, and a surface other than the raceway surface of the inner race, the raceway surface of the outer race, and the rolling surface of the rolling element is formed of the concavities, convexities, and the flat surface. This actuator includes the inner race, the outer race, and the plurality of rollers, and thus the specific example is a roller bearing.

Advantageous Effects of the Invention

According to the present invention, concavities serving as lubricant puddles are formed by scraping a surface of a component subjected to rolling contact or sliding contact of an actuator, and thus plastic deformation hardly occurs or does not occur at all. Hence, the concavities and the peripheries therearound are not hardened. Accordingly, the concavities perform elastic deformation and are temporarily collapsed and made small by a contacting counterpart component, but the lubricant does not leak out to the other areas since the concavities are formed independently. The lubricant pooled in the concavities is pushed out to the surface of the component where the concavities are formed, and lubricates a space between the former surface and the surface of the counterpart component, thereby reducing the frictional resistance of the actuator. Hence, the driving force of a device using this actuator can be reduced, and if this actuator is used for a rotating device, etc., it can contribute to lowered torque at the slow speed range. Furthermore, anti-seizing properties of the rotating device, etc., at the high speed range can be improved by the above-explained lubrication.

BRIEF DESCRIPTION OF THE DRAWINGS

FIG. 3 is a graph showing a relationship between an area ratio of concavities and torque according to the embodiment of the present invention;

FIGS. 4A and 4B are diagrams showing an elastic colliding material used in an example of the first embodiment of the present invention, in which FIG. 4A shows a whole external shape and FIG. 4B is a partial enlarged view of FIG. 4A;

FIG. 9A to FIG. 9C are diagrams showing hardening of a base material by a shot work.

DESCRIPTION OF EMBODIMENTS

Embodiments of the present invention will now be described with reference to the drawings.

First Embodiment

Figure 1:
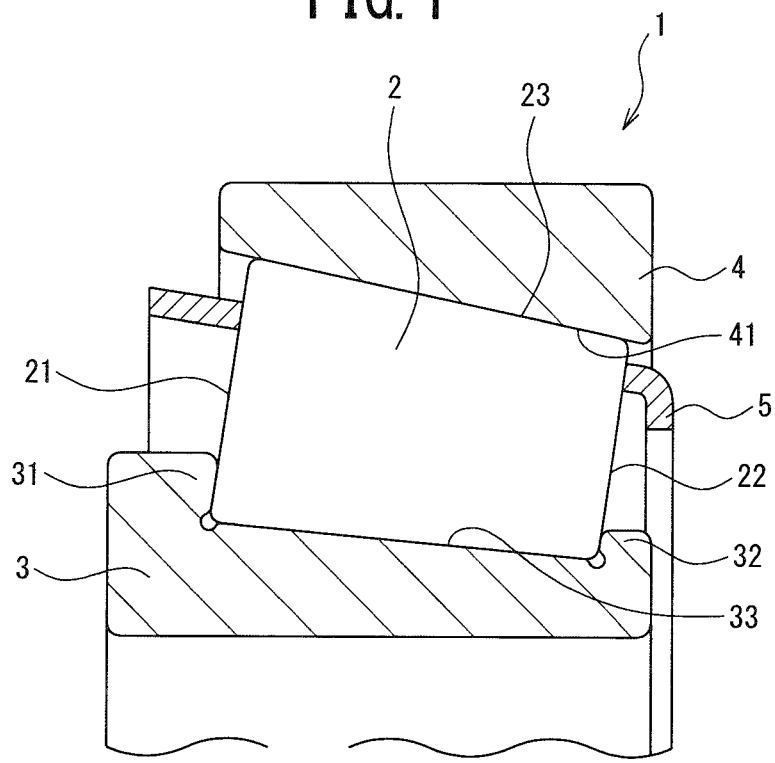
FIG. 1 is a cross-sectional view showing a part of a tapered roller bearing according to a first embodiment of the present invention.

FIG. 1 shows apart of a single-row tapered roller bearing 1 as an actuator according to an embodiment of the present invention. The roller bearing 1 includes a tapered roller 2 corresponding to the rolling element of the present invention, an inner race 3 and an outer race 4 relatively rotating to each other via the tapered roller 2, and a retainer 5 of the tapered roller 2. The inner race 3 is provided with a large flange 31 and a small flange 32. A lubricant is present in a space where the tapered roller 2 is placed between the inner race 3 and the outer race 4. This lubricant may be a grease composition containing a base oil and a thickener, or a lube oil.

In the given explanation so far, the bearing 1 is conventionally well-known, and the present invention is applicable to actuators including this single-row tapered roller bearing 1, bearings in other forms, a linear guide, and a ball screw.

When the present invention is applied to this bearing 1, a large number of concavities serving as lubricant puddles can be formed in one or a plurality of surfaces selected from a large end surface 21, a small end surface 22, and a rolling surface 23 of the tapered roller 2. According to this embodiment, however, the concavities are formed in the large end surface 21. Since the large end surface 21 has the largest area subjected to sliding contact in the tapered roller 2, this portion can maximally contribute to reduction of the bearing torque if the frictional resistance of this portion can be reduced. According to the present invention, however, it is also possible to form the concavities serving as lubricant puddles in other components and other portions. In particular, the concavities can be formed in the large end surface 21 and the small end surface 22. Those surfaces are subjected to sliding contact, and can maximally contribute to the reduction of the bearing torque if the frictional resistances of those portions can be reduced.

Figure 2:
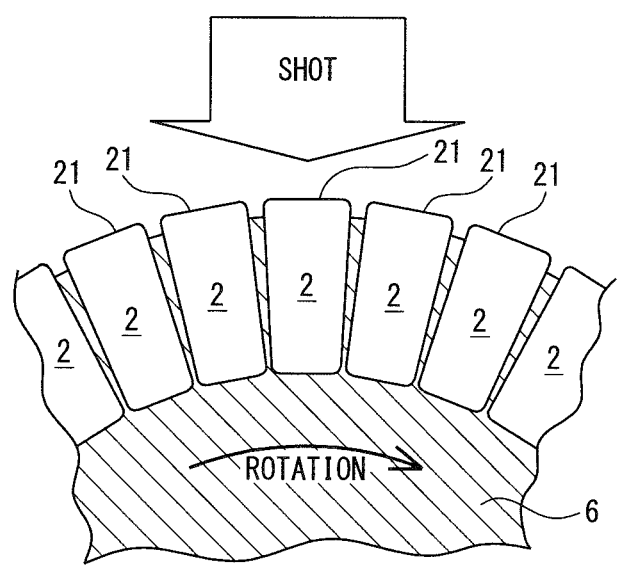
FIG. 2 is an explanatory diagram showing an example working by shot blasting.

The following is an example of forming concavities in the tapered roller 2. That is, as shown in FIG. 2, multiple tapered rollers 2 are set to the outer circumference of a rotatable holder 6 at an equal interval with the large end surface 21 being directed outwardly of the rotational direction. Next, fine particles are shot toward the large end surface 21 from the external side of the tapered roller 2 while continuously or intermittently rotating the holder 6. Since the tapered rollers 2 are arranged side by side and successively worked, each tapered roller 2 does not contact another tapered roller, and thus the possibility of a failure like denting can be reduced.

The fine particles used as shot materials are harder than the material of the tapered roller 2 and have an angular surface. The other materials can be used as the fine particles, but in this example, silicon carbide (SiC having a Vickers hardness of equal to or greater than 500) is used, and the lump of such silicon carbide is crushed to obtain particles in an angular shape. The fine particles used for shot blasting have a diameter of 0.5 to 100 μm in this embodiment. That is, the maximum size of the fine particles is set to be 100 μm, the minimum size thereof is set to be 0.5 μm, and the fine particles within this range are used. Accordingly, the large end surface 21 of the tapered roller 2 can be scraped at an area ratio to be discussed later, and the concavities within the range of an equal size can be formed. Hence, in the case of an ellipse explained above, the longer diameter is set to be the diameter of the concavities according to the present invention.

In order to scrape a surface of a component subjected to rolling contact or sliding contact to form the concavities, it is preferable that when the fine particles as the shot materials are other materials than silicon carbide, such materials should have a Vickers hardness of equal to or greater than 500 and have one or equal to or greater than two angles on the surface of such materials. Example behaviors of, when the surface of the component is scraped, the fine particles which contact the surface of the component and which have the angles scraping the surface of the component are as follows. First one is that the fine particles scrape the component without largely changing respective postures, scatter from the surface of the component, and fly off therefrom. Second one is that the fine particles contacting the component rotate like a spinning tool, scrape the component and then fly off therefrom. Third one is that the fine particles rotate so as to scoop the surface of the component, scatter from the surface thereof, and fly off therefrom. It is estimated that the fine particles are a mixture of those taking respective behaviors.

According to this example of forming the concavities, the pressure of the shot work was set to be equal to or lower than 1470 kPa, and the shot work time was set to be equal to or shorter than 20 minutes. However, in order to satisfy conditions at which the concavities each having a depth of equal to or greater than 1 μm have a pitch therebetween that is equal to or smaller than 200 μm and the concavities are isolated from one other, the shot conditions, such as the pressure, the time and the number of shot, are set. According to the example shown in FIG. 2, the shot work was performed for 10 minutes at a shot pressure of 600 kPa.

By performing a shot work with the fine particles in this fashion, a large number of independent concavities each having a diameter within a range from 0.5 to 100 μm and concavely scraped by the angles of the fine particles are formed in the large end surface 21 of the tapered roller 2. Since the large end surface 21 of the tapered roller 2 has no plastic deformation like the compression of the material, the surface causes no work hardening. Hence, the concavities can be used as the lubricant puddles while the surface maintains the hardness substantially same as the hardness before the shot work. The pitch of the concavities is equal to or smaller than 200 μm and the concavities are formed non-continuous and isolated from one another. The shot work with the fine particles can be performed several times within a predetermined time period, and one-time shot work within a short time can be performed.

It is ideal that each concavity has a circular shape or a closer shape thereto in viewing the surface where the concavities are formed from the front, but it is not always necessary that the concavity is in a circular shape. That is, according to the present invention, the concavities perform elastic deformation and are once collapsed by a contacting counterpart component, and thus the volume of each concavity becomes small. Accordingly, the lubricant retained in the concavities is pushed out to the surface of the component (in this embodiment, the large end surface 21 of the tapered roller 2) from the concavities, and a space between that surface and the surface of the counterpart component (in this embodiment, the large flange 31 of the inner race 3) is lubricated. Hence, it is appropriate if the concavities are each in an independent shape such that the lubricant in the concavities has no space to go when the concavities are depressed and once collapsed by the counterpart component and the lubricant is pushed out to the surface of the component. Accordingly, depending on the shape of the counterpart component, but it is appropriate if the shapes of the concavities have a size such that respective entire surfaces of the concavities are simultaneously blocked off by the counterpart component at a given timing. When the concavities are long like a linear shape, as explained above, there is a little possibility that the lubricant in the concavities has no space to go, and thus an elongated shape is not appropriate for the concavities of the present invention. However, when the ratio of the shortest diameter of the concavity and the diameter thereof in the direction orthogonal to the shortest diameter is within 1:2 in viewing the concavity from the front, even if the concavity is an ellipse, the entire surface of the concavity is blocked off by the counterpart component at a given timing, and such a concavity can function as the concavity of the present invention.

The percentage of the area that is a total of the areas of the large number of the concavities relative to the area of the surface where the concavities are formed, i.e., the area ratio is set to be equal to or greater than 10% and equal to or smaller than 40%. However, it is preferable that such an area ratio should be equal to or greater than 15% and equal to or smaller than 30%. Regarding the lower limit of the area ratio, for tapered roller bearings having the concavities as the lubricant puddles with the above-explained size formed in the large end surface 21 of the tapered roller 2, the area ratio was changed and torque was measured. Results indicated by the graph in FIG. 3 were thus obtained. As is clear from this graph, the torque of the bearing sharply decreases until the area ratio of the concavities increases toward 10% from 5%, the reduction of the torque becomes slow when the area ratio reaches 10%, and the reduction of the torque further becomes slow when the area ratio reaches 15%. That is, when the lower limit of the area ratio of the concavities becomes 10%, the reduction of the torque becomes sufficiently apparent, and when the lower limit becomes 15%, the reduction of the torque becomes further remarkable until the area ratio becomes 25%.

It is not illustrated in FIG. 3 but when the area ratio of the lubricant puddles increases, the lubrication function is improved, and thus it can be estimated that even if the area ratio exceeds 25%, the torque can be further reduced in small decrements. However, when the area ratio increases, the contact area between the large end surface 21 of the tapered roller 2 and the large flange 31 of the inner race 3 decreases, and thus the load capacity (the load performance) as a bearing and the roughness of the surface where the concavities are formed decrease. In order to prevent the decrease of both load capacity and surface roughness, it is desirable to set the upper limit of the above-explained area ratio. The upper limit of the area ratio is set to be 40% from this standpoint, and is set to be 30% as explained above in order to enhance the sufficient load capacity.

The large end surface 21 of the tapered roller 2 having undergone the above-explained shot work has three-dimensional surface roughness parameters which are Sa (arithmetic mean roughness) of equal to or greater than 0.1 μm, RsK (deviation (skewness) of surface height distribution) of equal to or greater than −1, and Rku (peakedness (kurtosis) of surface height distribution) of equal to or smaller than 10. Sa, Rsk, and Rku are parameters defined in ISO25178, and the above-indicated values are measurement results obtained by the inventors of the present invention through a non-contact profilometer (Zygo).

Another example of forming the concavities in the tapered roller 2 is as follow. That is, multiple tapered rollers 2 are put in a rotatable bucket at random having an opening. Next, the fine particles are shot toward the tapered rollers 2 from the opening of the bucket while continuously rotating the bucket, thereby performing a shot work on the entire surface of each tapered roller 2. The surface subjected to the shot work is not limited to the large end surface 21 of the tapered roller 2 but a large number of concavities serving as lubricant puddles are formed in the entire surface of each tapered roller 2 in this manner.

According to this example, the fine particles as the shot materials are silicon carbide having a diameter of equal to or smaller than 100 μm and angles formed on the surface of each particle, and the shot conditions, such as the pressure, the time, and the number of shot work are set within the conditions having the shot pressure set to be equal to or smaller than 1470 kPa and the shot work time set to be equal to or shorter than 20 minutes. As a condition of the shot work, the rotating speed of the bucket was set to be 5 min$^{-1}$, and a shot work was performed on the tapered roller 2 for 5 minutes at a shot pressure of 600 kPa, and the tapered roller 2 was produced.

By performing shot work with the fine particles in the manner as explained above, a large number of independent concavities each having a diameter within a range from 0.5 to 100 μm, a depth of equal to or greater than 1 μm (and desirably, equal to or smaller than 5 μm) and concavely scraped by the angles of the fine particles are formed in the entire surface of the tapered roller 2. At this time, the pitch between the concavities is equal to or smaller than 200 μm, and the concavities are non-continuous and formed isolated from one another.

The surface of the tapered roller 2 having undergone the shot work satisfies conditions in which Ra (arithmetic mean height) is 0.1 to 0.2 μm, Rsk (skewness) is −1 to −0.2, and Rku (kurtosis) is 3 to 7 when expressed with surface roughness parameters. Hence, the oil-slick formation performance is improved by the concavities, and thus a good torque reduction effect can be accomplished.

As the roller bearing 1 employing the structure shown in FIG. 1, a tapered roller bearing having a bearing designation of HTFR45-24 (internal diameter: 45 mm, external diameter: 95.25 mm, maximum width: 35 mm, and larger diameter of tapered roller: 13.779 mm) was produced for a test, and torque was compared with conventional product (having undergone no shot work). The test was carried out in such a way that the inner race 3 was rotated for 24 hours under a condition in which the axial load was 4 kN and the rotating speed was 300 min$^{-1}$ while a mineral oil (VG68) having a temperature of 60° C.±3° C. was supplied at 200 ml/min which was little from a normal supply amount (300 ml/min), and then torque was measured.

The following table 1 shows a result.

TABLE 1

|  | Surface condition of roller | | | Torque |
| --- | --- | --- | --- | --- |
|  | Ra | Rsk | Rku | reduction rate |
| Present invention | 0.15 | −0.5 | 5 | 50% |

As is clear from this result, the torque can be reduced by 50% in comparison with a conventional product (having undergone no shot work), and thus the torque reduction effect can be obtained.

By putting the work targets in the bucket at random, and by performing a shot work on such work targets from the exterior of the bucket, the mass production of the rolling elements formed with the concavities and the component thereof is enabled.

Moreover, when the formation target of the concavities is limited to a part of the rolling element and that of the other components, a surface not subjected to the shot work can be masked. For such a masking, a masking tape, etc., can be used.

According to the above-explained examples of forming the concavities, the explanation was given of the case in which the present invention is applied to the tapered roller 2 of the roller bearing 1, but the present invention is not limited to this case. The present invention can be applied to any one of the inner-race raceway surface 33, the large flange 31 of the inner race, and the outer-race raceway surface 41. Moreover, the present invention can be applied to equal to or greater than two of the inner-race raceway surface 33, the large flange 31 of the inner race, the outer-race raceway surface 41, and the tapered roller 2.

The shot work is applied to form the concavities, but other work techniques can be applied.

As explained above, the oil-slick formation performance by the concavities having no work hardening reduces the frictional coefficient, and there is an advantage that the reduction of the torque is enabled at, in particular, the slow speed range where the sliding friction is dominant.

To form the concavities as explained above, when fine particles formed of a hard material and having one or equal to or greater than two angled surfaces are brought into high-pressure air and shot to the surface of the component to scrape the surface of the component to form the large number of concavities, convexities may be formed at the edge of the component. That is, when the fine particles at the concavities fly off, a part of the component may deform in the direction in which the fine particles fly off due to the impact of the scraping, and convexities like burr may be formed. Such convexities may have an aggression against the counterpart component when the component formed with such convexities contacts the counterpart component in a sliding or rolling manner, and may form dents, etc., in the counterpart component. Hence, the convexities formed at the edges of the concavities are removed by one of the following first to third methods. A plurality of methods among the first to third methods can be continuously applied in a two-stage or three-stage manner. That is, for removal of the convexities, a first removal, a second removal, and as needed, a further third removal can be performed.

A first method for removing the convexities is a barrel polishing. This is to put a work-piece subjected to polishing and fine particles as a polishing agent in a polishing bath, and to polish the work-piece by the fine particles by applying rotation or vibration to the polishing bath. According to this embodiment, the convexities of the tapered roller 2 are polished by barrel polishing. By removing the convexities through this method, the aggression against the inner and outer races 3 and 4 to which the tapered roller 2 contacts is reduced, thereby preventing a failure, such as damaging or scratching. A rotational barrel polishing technique, a vibration barrel polishing technique, or a centrifugal barrel polishing technique can be applied to the above-explained barrel polishing.

The surface of the tapered roller 2 having undergone the barrel polishing satisfies conditions in which Ra (arithmetic mean height) is 0.1 to 0.2 μm, Rsk (skewness) is −1 to −0.2, and Rku (kurtosis) is 3 to 7 when expressed with surface roughness parameters. Hence, the oil-slick formation performance is improved by the concavities having the convexities removed, and thus a good torque reduction effect can be accomplished.

The barrel polishing technique is a work in a polishing bath, can process a large number of work-pieces put in the polishing bath, and contributes to the mass production of the actuator like a bearing when performed sequentially from a shot work of putting work-pieces in a bucket to form concavities.

The second convexity removal method is polishing by a grindstone. Example grindstones are a vitrified grindstone, a diamond grindstone, a borazon grindstone, a PVA grindstone, and a super-stone grindstone which are commonly used for polishing.

The above-explained polishing by the grindstone can be performed sequentially from the formation of the concavities shown in FIG. 2 with the tapered roller 2 being supported by the holder 6. That is, the grindstone is caused to contact the large end surface 21 of the tapered roller 2 while continuously or intermittently rotating the holder 6 likewise the shot blasting to polish that large end surface. This enables the polishing work of the convexities without re-arranging the tapered rollers 2, and thus a time and a labor work for the polishing work can be reduced.

The surface of the tapered roller 2 having undergone the polishing by the grindstone also satisfies conditions in which Ra (arithmetic mean height) is 0.1 to 0.2 μm, Rsk (skewness) is −1 to −0.2, and Rku (kurtosis) is 3 to 7 when expressed with surface roughness parameters. Hence, the oil-slick formation performance is improved by the concavities having the convexities removed, and thus a good torque reduction effect can be accomplished.

The third convexity removal method is to use elastic colliding materials 7 shown in FIG. 4. FIG. 4 is a cross-sectional view showing an example elastic colliding material 7, which is formed by firmly bonding a large number of hard particles 72 on the outer circumference of a spherical rubber elastic material 71 by a bond. The large number of elastic colliding materials 7 are shot to the surface where the large number of concavities are formed to polish and remove the convexities. The rubber elastic material 7 is formed of a natural rubber or a synthetic rubber, but the other materials can be used as long as it is a rubber-like elastic material. Spherical elastic materials having a diameter of 1 to 6 mm are used in this embodiment, but can be in other shapes and have other sizes as long as it can polish the convexities by a shot work to be discussed later.

The hard particles 72 are firmly bonded to the outer circumference of the rubber elastic material 71 that is the main body of the elastic colliding material 7 as uniform as possible via the bond. The particles 72 have a polishing function like diamond particles, and have a diameter of 5 to 70 μm.

When the surface where the concavities are formed is shot by the shot materials that are the above-explained elastic colliding materials 7, the elastic colliding materials 7 having a diameter in a unit of mm polish the surface where the concavities each having a diameter of equal to or smaller than 100 μm are formed. Hence, the convexities formed at respective edges of the concavities are polished and removed. At this time, since the elastic colliding materials 7 are each formed of the rubber elastic material 71 as the main body, the elastic colliding materials 7 fit with the shapes of the convexities, and polish the convexities while being deformed. Accordingly, the contact area to the convexities increases, and thus the polishing efficiency of the convexities becomes high.

The shot work with the elastic colliding materials 7 can be performed sequentially from the formation of the concavities shown in FIG. 2 with the tapered rollers 2 being supported by the holder 6. The elastic colliding materials 7 are shot to the large end surface 21 of the tapered roller 2 in an oblique direction which is substantially 45 degrees from the large end surface. The diameter of the rubber elastic material 71 is set to be 1 mm, diamond particles each having a diameter of 1 μm are firmly bonded thereto, and the shot work is performed for five minutes. The shot work with the elastic colliding materials 7 may be blasting or a Sirius work. Conventionally well-known work techniques can be applied.

The surface of the tapered roller 2 having undergone the shot work with the elastic colliding materials 7 satisfies conditions in which Ra (arithmetic mean height) is 0.1 to 0.2 μm, Rsk (skewness) is −1 to −0.2, and Rku (kurtosis) is 3 to 7 when expressed with surface roughness parameters. Hence, the oil-slick formation performance is improved by the concavities in which the convexities are removed, and thus a good torque reduction effect can be accomplished.

Moreover, when the work targets are put in a bucket at random as explained above and a shot work is performed to form the concavities, the shot work with the elastic colliding materials 7 can be likewise performed with the work targets being put in the bucket.

It is needless to say that conditions of the elastic colliding materials 7, such as respective sizes and the material, can be changed depending on the conditions, such as the material of the work target, the size of the concavity, and that of the convexity.

When the present invention is applied to bearings of, for example, a differential, a transmission, and a transfer of an automobile which are used in a slow rotation range under a lubricated condition, the large effect of reducing torque can be obtained. Moreover, the actuator of the present invention can be formed by performing a shot work on a work target to form the concavities or to remove the convexities with a nozzle being directed to the work target, and thus the present invention can be suitably applied to a large-diameter bearing for a windmill, a construction machine, and a machine in the iron and steel industries.

Second Embodiment

Figure 5:
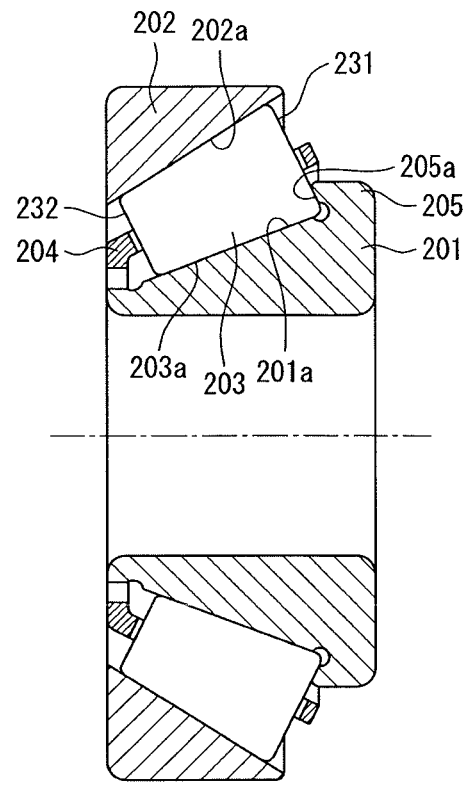
FIG. 5 is a vertical cross-sectional view showing a structure of a tapered roller bearing according to a second embodiment of the present invention.

A second embodiment of the present invention will be explained below with reference to FIG. 5. FIG. 5 is a vertical cross-sectional view showing a structure of a tapered roller bearing that is an embodiment of the actuator of the present invention.

The tapered roller bearing shown in FIG. 5 includes an inner race 201 having a raceway surface 201a on the outer circumference thereof, and an outer race 202 having a raceway surface 202a on the inner circumference thereof and facing the raceway surface 201a of the inner race 201. This bearing also includes a plurality of tapered rollers 203 provided between the inner race 201 and the outer race 202 and both raceway surfaces 201a and 202a in a freely rotatable manner, and a retainer 204 that retains the plurality of tapered rollers 203 between the inner race 201 and the outer race 202. Moreover, an unillustrated lubricant (e.g., a lube oil or a grease) is provided in a bearing internal space formed between the outer circumference of the inner race 201 and the inner circumference of the outer race 202. The retainer 204 can be omitted.

A flange 205 is formed on either one of the inner race 201 and the outer race 202. FIG. 5 illustrates an example case in which the flange 205 protruding outwardly of the radial direction is formed on an end of the outer circumference of the inner race 201 in the axial direction (the end at the large-end surface-231 side of the tapered roller 203). The outer race 202 is provided with no flange. However, as an opposite case of the example shown in FIG. 5, the flange may be provided on an end of the inner circumference of the outer race 202 in the axial direction and the inner race 201 may be provided with no flange, or both inner race 201 and outer race 202 may be provided with respective flanges. For both inner race 201 and outer race 202, the flange may be provided on an end in the axial direction (the end at the large-end surface-231 side of the tapered roller 203 or the end at the small-end surface-232 side), or the flanges may be provided on both ends in the axial direction (the end at the large-end surface-231 side of the tapered roller 203 and the end at the small-end surface-232 side).

An inner side face 205a of the flange 205, i.e., the flange face serves as a surface that guides and holds the tapered rollers 203, and contacts respective end surfaces of the tapered rollers 203 in a frictional manner. According to the example case shown in FIG. 5, the flange face contacts respective large end surfaces 231 of the tapered rollers 203 in a frictional manner.

The inner race 201, the outer race 202, and the tapered rollers 203 each have a plurality of circular concavities (unillustrated) formed in the entire surface by scraping such a surface upon collision with particles having at least one angle. Those concavities have various depths, but most (e.g., equal to or more than half) concavities have a depth of equal to or greater than 1 µm and the concavities with a depth of equal to or greater than 1 µm mare disposed uniformly at a pitch of equal to or smaller than 200 µm.

Those concavities serve as lubricant puddles, and have an effect of enhancing the lubrication of respective frictional components of the tapered roller bearing. Since the circular concavities with a predetermined depth are disposed uniformly, such concavities can serve as good lubricant puddles, thereby accomplishing a high oil-slick formation performance. Accordingly, the tapered roller bearing of this embodiment is long life. In particular, the lubrication between the end surface (the large end surface 231 in the example case shown in FIG. 5) of the tapered roller 203 and the flange face 205a is good, torque obtained in the slow rotation range can be lowered, and the seizing at the fast rotation range can be prevented.

When most of the plurality of circular concavities have a depth of smaller than 1 µm, a failure such as immediate worn-out of the concavities may occur. Moreover, when the pitch of the circular concavities having a depth of equal to or greater than 1 µm exceeds 200 µm, a failure such as reduction of the torque lowering effect may occur.

The circular concavities are formed in respective entire surfaces of the inner race 201, the outer race 202, and the tapered rollers 203. However, it is particularly important that such concavities are formed in both raceway surfaces 201a and 202a, respective rolling surfaces 203a of the tapered rollers 203, the flange face 205a, and respective end surfaces (the large end surfaces 231 in the example case shown in FIG. 5) which are subjected to frictional contact when the tapered roller bearing rotates. When the circular concavities are formed in any one of the inner race 201, the outer race 202, and the tapered rollers 203, the lubrication of respective frictional components of the tapered roller bearing can be enhanced. However, it is preferable that such concavities should be formed in any two of those components, and it is most preferable that such concavities should be formed in all components.

The application of such a tapered roller bearing according to this embodiment is not limited to any particular one, but it is especially suitable if it is used as the tapered roller bearing for an automobile differential gear (often used in a slow rotation range).

A method for producing the tapered roller bearing according to the second embodiment will now be explained in detail.

First, a shot work is performed on at least one of the inner race 201, the outer race 202, and the tapered rollers 203 to cause such a component to be collided with particles each having at least an angle (a first process). According to such a shot work, particles each having at least an angle collide with the entire surface of the inner race 201, the outer race 202, or the tapered rollers 203 and such a surface is scraped by such particles, and thus circular concavities are formed. Moreover, convexities formed of extra materials of respective concavities are formed around respective concavities. When it is desirable to form the circular concavities in not the entire surface but a part of such a surface, the portion of the surface where no circular concavity is formed is masked by a tape, etc., and only the portion of the surface where formation of the circular concavities is desirable is exposed.

A suitable shot work for letting the particles each having at least an angle to collide with the surface is a shot peening process. The kind of the particles each having at least an angle is not limited to any particular one, but a hard material is preferable (more preferable if it has Vickers hardness of equal to or greater than 500), and silicon carbide, silicon nitride, ceramics like alumina and metals are preferable. Moreover, the shape of the particles each having at least an angle is not limited to any particular one, but an example shape is non-spherical, more specifically, a polygonal shape, an amorphous shape, a needle shape, a grid shape, and a sand-like shape. When spherical particles formed of a hard material are shot, concavities and convexities can be formed in the surface, but the surface hardening may occur, and the surface becomes hard and rough which suppresses the easy-adaptation of the lubricant to such a surface.

Moreover, regarding the size of the particles each having at least an angle, it is preferable that the diameter of such a particle should be equal to or smaller than 100 µm. If the diameter of such a particle having at least an angle exceeds 100 µm, the circulation performance of the particles may become insufficient.

By causing the surface to be collided with the particles each having at least an angle, circular concavities each having a depth of equal to or greater than 1 µm and a diameter of equal to or smaller than 50 µm are uniformly disposed at a pitch of equal to or smaller than 200 µm.

Next, a process (a second process) of removing a part of the above-explained convexity and reducing the size of each convexity is performed on the component having undergone the shot work among the inner race 201, the outer race 202, and the tapered rollers 203. This process is not limited to any particular one as long as respective convexities can be made smaller, but the following mirror finishing is preferable. That is, it is a process of shooting the surface formed with the convexities with elastic particles having a plurality of hard particles on the surface thereof to cause such elastic particles to collide with such a surface. Respective convexities can be made smaller if a polishing work, etc., is applied instead of the mirror finishing, but in this case, it is necessary to pay an attention that the circular concavities are not buried by the plastic flow of the convexities.

The elastic particles may employ a structure like the one shown in FIG. 4 and used in the first embodiment in which a plurality of hard particles are firmly bonded to the surface of each granular elastic material by a bond, etc. Moreover, it may be a mixture of elastic materials and hard particles that are protruding from the surface of each elastic material. The kind of the elastic material is not limited to any particular one, but examples of such a material are a rubber, and a thermoplastic elastomer. Moreover, the kind of the hard particles is not limited to any particular one, but examples of such particles are alumina, diamond, and silicon carbide.

It is preferable that the ratio of the hard particles in the entire elastic material having the hard particles provided on the surface thereof should be equal to or greater than 10 mass % and equal to or smaller than 90 mass %.

Moreover, it is preferable that each elastic particle of the second embodiment should have a diameter of equal to or smaller than 5 mm, and each hard particle should have a diameter of equal to or smaller than 50 μm. When the diameter of each elastic particle exceeds 5 mm, the circulation performance of the particles becomes insufficient. Conversely, when the diameter of each hard particle exceeds 50 μm, the surface may be made rough although the convexities can be removed.

By causing the surface to be collided with the elastic particles each having the hard particles on the surface thereof, a part of each convexity formed through the first process is removed and the convexity can be made smaller, and thus the surface can have a larger ratio of the concavities than that of the convexities.

If the convexities maintain the sizes thereof as those are when formed through the first process, the surface of the counterpart component subjected to a frictional contact is damaged by the convexities and the surface roughness becomes worse. Accordingly, the torque in the slow rotation range may increase, and the seizing in the fast rotation range becomes likely to occur. When, for example, large convexities are formed on the flange face 205a, the end surface (the large end surface 231 in the example case shown in FIG. 5) of the tapered roller 203 frictionally contacting such a flange face is damaged by the convexities, and the surface roughness becomes worse, resulting in the above-explained failures. However, if the convexities are made smaller through the second process, the aggression against the surface of the counterpart component can be reduced, and thus the above-explained failures are not likely to occur. Hence, according to the tapered roller bearing of this embodiment, the torque in the slow rotation range is lowered and the seizing in the fast rotation range is suppressed.

Next, the surface of the component among the raceway surface 201a of the inner race 201, the raceway surface 202a of the outer race 202, and the rolling surfaces 203a of the tapered rollers 203 having undergone the shot work of the first process is polished. This polishing is performed through common techniques like polishing by a grindstone, and is a process of completely removing the convexities made smaller through the second process to make the surface flat, and leaving only the circular concavities (a third process). Through such a process, the raceway surface 201a, the raceway surface 202a or the rolling surface 203a becomes a flat surface having only the circular concavities left.

The surface of the inner race 201 other than the raceway surface 201a, the surface of the outer race 202 other than the raceway surface 202a, and the surface of the tapered roller 203 other than the rolling surface 203a are left as those are right after the second process completes. Accordingly, the convexities made smaller in the second process are left as those are, and the above-explained flat surface contains the circular concavities and the convexities that are made smaller.

The raceway surface 201a, the raceway surface 202a, and the rolling surface 203a are all polished to be flat, and each have a plurality of concavities serving as the lubricant puddles. Accordingly, the tapered roller bearing of this embodiment has a good lubrication performance, and is long-life.

The shot peening in the first process and the mirror finishing in the second process will be explained in more detail. The condition of the shot peening is not limited to any particular one, but it is preferable that a pressure of a shot work of particles each having at least one angle should be equal to or smaller than 1470 kPa, and the time for shot work should be equal to or shorter than 20 minutes. The shot peening can be carried out by shooting a work target with the particles each having at least one angle with a nozzle for spraying such particles being directed to the work target. Accordingly, there is an advantage that the concavities can be easily formed regardless of the size of the work target. Moreover, when the work targets are put in a container like a bucket and shot with such particles, the shot work becomes easier, and thus this work method facilitates mass production of the products.

A specific example of the shot peening in the first process will be explained. A plurality of tapered rollers are put in a bucket-like component having a large opening, and a nozzle for spraying needle-shaped particles of silicon carbide (particles each having at least one angle) is placed near the opening. The needle-shaped particles of silicon carbide each having a diameter of 30 μm are sprayed from the nozzle at the shot work pressure of 600 kPa for 10 minutes while rotating the bucket-like component at the rotation speed of several rpm.

By performing the shot peening in the first process, the arithmetic mean roughness Sa can be equal to or smaller than 0.1 μm, and Sk indicating the distortion level of the roughness curve can be equal to or smaller than −1.6.

On the other hand, the condition of the mirror finishing in the second process is not limited to any particular one, and the mirror finishing can be carried out in a normal shot work condition. A specific example of the mirror finishing in the second process will be explained. The tapered rollers having undergone the shot peening are put in a container like a strainer, and shot with rubber particles each having a plurality of diamond particles firmly bonded to the surface by a bond for five minutes from an oblique direction. The diamond particle has a diameter of 10 μm, and the rubber particle has a diameter of 1 mm.

By performing the mirror finishing in the second process, the convexities can be made smaller, and thus the maximum roughness in height Rz can be a small value, which is equal to or greater than 0.4 μm and equal to or smaller than 2.0 μm. The surface in which the mirror finishing was performed was measured through a non-contact surface shape profilometer (made by Zygo Corporation), and the result can be expressed as follows using three-dimensional surface roughness parameters. That is, the arithmetic mean roughness Sa was equal to or smaller than 0.1 μm, the deviation (skewness) Ssk of a surface height distribution was equal to or smaller than −1, and the peakedness (kurtosis) Sku of the surface height distribution was equal to or greater than 5. Note that Sa, Ssk, and Sku are parameters defined in ISO25178.

Respective conditions of the shot peening in the first process and the mirror finishing in the second process are not limited to the above-explained ones, and it is preferable to change the size of each circular concavity depending on the size of the contacting region of the frictional contacting surface by changing accordingly the conditions.

However, the area of the circular concavities is set to be equal to or greater than 10% and equal to or smaller than 40% of the area of the contacting region, and preferably, equal to or greater than 15% and equal to or smaller than 30%. Moreover, it is preferable that the dimension of the circular concavities should be equal to or greater than 5% and equal to or smaller than 50% of the dimension of the contacting region. Furthermore, it is preferable that the depth of the circular concavities should be equal to or greater than 1 μm and equal to or smaller than 5 μm.

When the area ratio of the circular concavities (the area of the circular concavities relative to the area of the contacting region) is smaller than 10% or exceeds 40%, the oil-slick formation performance may become insufficient. In particular, when it exceeds 40%, the flat surface supporting the load becomes little, and the oil-slick may become thin, resulting in a worn-out.

Moreover, when the dimension of the circular concavities is smaller than 5% of the dimension of the contacting region or exceeds 50% thereof, the oil-slick formation performance may become insufficient. In particular, when it exceeds 50%, the pressure becomes small at the bottom of the circular concavity, resulting in an excess contact.

Furthermore, when the depth of the circular concavity is smaller than 1 μm, the circular concavities may be worn out due to an initial wear. Conversely, when it exceeds 5 μm, the dynamic pressure effect cannot be easily obtained when the lubricant flows in the circular concavities, resulting in a poor oil-slick formation performance.

After the first process and the second process, the convexities are completely removed by the polishing in the third process regarding the raceway surface 201a, the raceway surface 202a, and the rolling surface 203a, and thus Ra (Sa) can be set to be equal to or smaller than 0.07 μm. For example, in the case of the rolling surface of a rolling element, it can be polished by, for example, centerless polishing.

Through such processes, the circular concavities can be uniformly formed each having a diameter of equal to or greater than 10 μm and equal to or smaller than 50 μm, and a depth of equal to or greater than 1 μm at a pitch of equal to or smaller than 200 μm by selecting work conditions as needed.

This embodiment shows an example of the present invention, and the present invention is not limited to such an embodiment. For example, the explanation was given of the tapered roller bearing as an example roller bearing, but the present invention can be applied to various kinds of roller bearings. For example, such roller bearings include a cylindrical roller bearing, a needle roller bearing, and a self-aligning roller bearing. Moreover, the present invention is not limited to radial roller bearings, but can be applied to thrust roller bearings.

Moreover, the present invention is not limited to roller bearings, but can be applied to ball bearings. However, ball bearings have little sliding frictional part, and most rolling friction is dominant in such bearings, and thus the bearing torque is originally low. Accordingly, even if the circular concavities are formed, with respect to the bearing torque, such a torque is not reduced largely.

Furthermore, the present invention is not limited to the rolling bearings, and can be applied to other actuators, i.e., direct acting devices, such as a linear guide and a ball screw. In particular, the present invention is suitable for the linear guide that uses a roller as a rolling element.

Still further, the present invention can be applied to not only common roller bearings formed of bearing steel (SUJ2) but also rolling bearings formed of a ceramic or a non-ferrous metal, etc. In this case, it is necessary to change settings of the conditions, such as the pressure of the shot work and the time thereof.

A chemical conversion coating may be applied on the surface (the internal surface) of the circular concavities, or a solid lubricant or a hard film may be applied. Further reduction of the torque and extension of the lifetime can be expected in this case.

EXAMPLES

Figure 6:
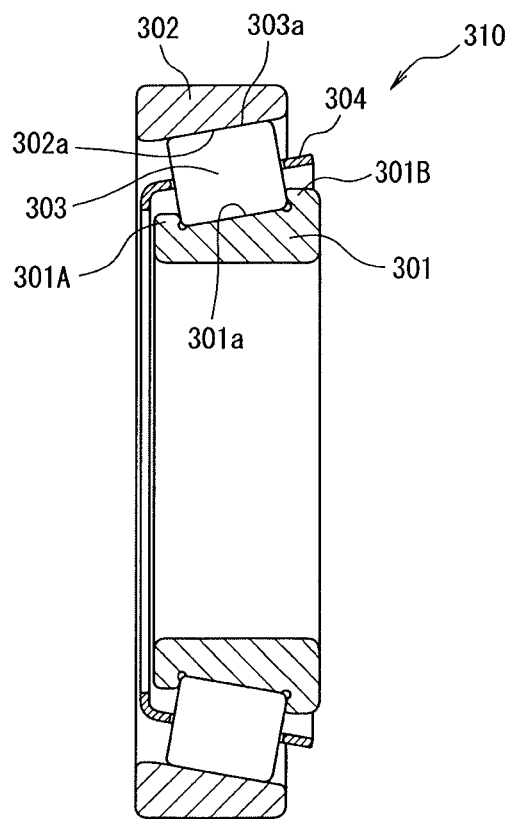
FIG. 6 is a vertical cross-sectional view showing a modified example of FIG. 5.

A production process of the tapered roller bearing according to the second embodiment and a performance test for such a bearing will be explained below with reference to the accompanying drawings. FIG. 6 shows a tapered roller bearing 310 that is a tapered roller bearing having a bearing number of HR30307C (internal diameter: 35 mm, external diameter: 80 mm, and maximum width: 22.75 mm) made by NSK Ltd.

The tapered roller bearing 310 includes an inner race 301 having an inner-race raceway surface (rolling surface) 301a, and an outer race 302 having an outer-race raceway surface (rolling surface) 302a. Moreover, the bearing 310 includes a plurality of rollers 303 provided between the inner race 301 and the outer race 302, and a retainer 304 that retains the rollers 303 in a freely rollable manner. The rollers are provided between the inner-race raceway surface 301a and the outer-race raceway surface 302a in a freely rollable manner, and are each formed in a conical shape having a rollable surface (rolling surface) 303a.

According to this tapered roller bearing 310, flanges 301A, and 301B are formed at both ends of the inner race 301 in the axial direction, and the rollers 303 are guided in such a way that end surfaces thereof in the axial direction are subjected to rolling contact with the flanges 301A and 301B.

The inner race 301, the outer race 302, and the rollers 303 were produced as follows. First, a material formed of two kinds of high carbon chromium bearing steels (SUJ2) was processed to respective shapes of the inner race 301, the outer race 302, and the rollers 303, and was subjected to carbonitriding for three hours under a mixture gas atmosphere (RX gas+enrich gas+ammonium gas) at the temperature of 840° C. Next, oil-hardening and metal tempering were performed. Subsequently, the amount of remaining austenite of respective surface portions (portions up to a depth of 250 μm from the top faces) of the inner race 301, the outer race 302, and the rollers 303 was adjusted to 15 to 40 volume %, and the hardness of the surface portion was adjusted to HRC62 to 67 (Hv746 to 900).

Next, the rollers 303 obtained in this manner were put in a bucket having an inlet largely opened, and a nozzle for spraying needle-shaped SiC particles was placed near the inlet. Subsequently, the SiC particles each having a diameter of substantially 30 μm were sprayed from the nozzle at a pressure of 600 kPa for 10 minutes (shot work) while rotating the bucket in which the rollers 303 were put at several rpm.

Furthermore, the rollers 303 were put in a container like a strainer, and shot with, for substantially five minutes from an oblique direction, particles which were rubber elastic materials each having a diameter of substantially 1 mm and having diamond particles of substantially 10 μm firmly bonded to the surface by a bond (mirror finishing).

Thereafter, the rolling surface of the rollers 303 that were rolling elements was polished by, for example, centerless polishing, and the surface roughness of the rolling surface was adjusted to be equal to or smaller than 0.07 μm.

Next, using the inner race 301, the outer race 302, and the rollers 303 obtained in this manner and the retainer 304 formed of SPCC, the tapered roller bearing 310 was assembled and a rotational test under the following conditions was performed.

Figure 7:
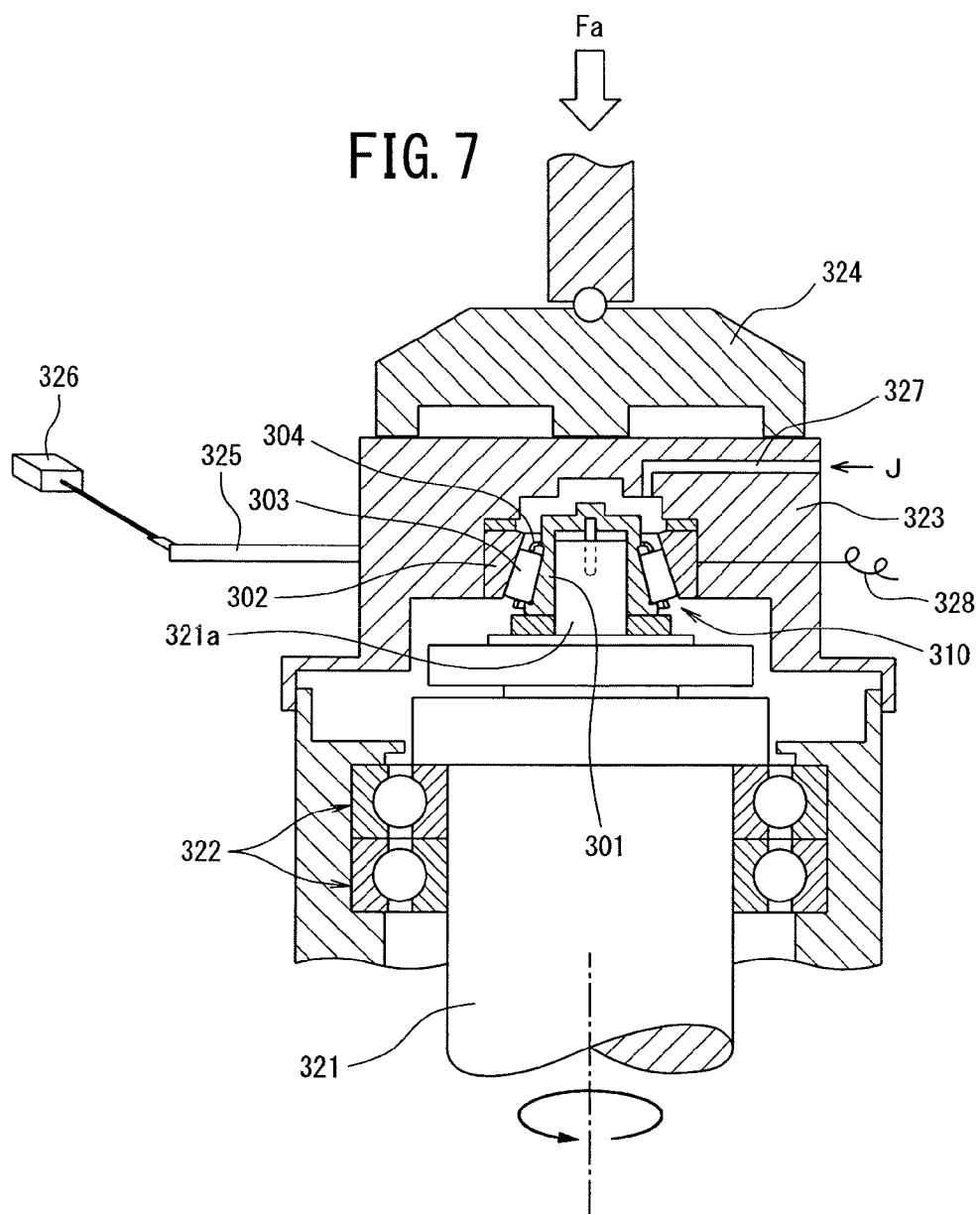
FIG. 7 is a cross-sectional view showing a vertical inner race rotating tester.

The rotating test was carried out using a vertical inner race rotating tester shown in FIG. 7. As shown in FIG. 7, the tester included a main shaft 321, a support bearing 322 provided at an end 321a of the main shaft 321 in the axial direction, a main body 323, and a hydrostatic bearing 324 provided at an upper end surface of the main body 323 in the axial direction. The tester was used with the inner race 301 of the tapered roller bearing 310 that was a test bearing being fitted to the outer circumference of the main shaft 321, and the outer race 302 being fitted to the inner circumference of the main body 323.

Moreover, the tester was configured to apply an axial load Fa from the upper space of the hydrostatic bearing 324. Furthermore, a load cell 326 was coupled to the side face of the main body 323 through a bar component 325 to detect a dynamic frictional torque applied to the main body 323. Still further, the side face of the main body 323 was provided with a passage 327 for supplying a lubricant J to the rolling surface of the tapered roller bearing 310 that was the test bearing, and a thermocouple 328 for detecting a temperature of the rolling surface.

This rotational test was carried out by rotating the inner race 301 under the following conditions while supplying a less amount of the lubricant J than a normal amount (300 ml/min), and a bearing torque was measured after the inner race 301 was rotated for a certain period (24 hours). The result is shown in table 2 in comparison with a case in which the bearing torque of the tapered roller bearing 310 using the rollers 303 of No. 5 as a comparative example is 1.

The preprocessing "barrel work" indicated in table 2 indicates a process of, performing a crude processing of forming large dimples on a surface by mixing various medium and additives under an atmospheric condition, and of performing a finish work for adjusting the roughness of a plateau part (a flat part) under an atmospheric condition to form dimples in respective surfaces of the rollers.

[Rotational Test Condition]
Load: 9.8 kN
Rotating speed: 1500 $min^{-1}$
Lubricant: turbine oil with ISO viscosity grade of ISO VG32
Bearing lubricant amount: 200 ml/min
Lubricant temperature: 30±3° C.

TABLE 2

| No. | Shot work Kind of particle | Shot work Time (min) | Process time of mirror finishing | Maximum height roughness Rz (μm) | Torque |
|---|---|---|---|---|---|
| 1 | SiC | 10 | 3 | 0.5 | 0.5 |
| 2 | Sic | 10 | 6 | 0.4 | 0.4 |
| 3 | Sic | 10 | 9 | 0.3 | 0.6 |
| 4 | Sic | 10 | 12 | 0.1 | 0.8 |
| 5 | — | — | — | 0.08 | 1.0 |
| 6 | Barrel work | — | — | 0.5 | 0.8 |

As shown in table 2, according to the tests No. 1 to 4 that were examples in which a shot work was performed using needle-shaped SiC particles, the torque was further reduced in comparison with a test No. 5 that was a comparative example in which no shot work and mirror finishing were performed. The surface having undergone the shot work with SiC particles had extremely minute concavities and convexities, and the depth of such concavities and convexities had a keen angle.

When a shot work was performed using glass beads, there is a possibility that the surface became rough and hard due to surface hardening, the lubricant did not adapt well to such a surface, and thus the bearing torque did not decrease largely.

Conversely, according to the tests No. 1 to No. 4 in which the shot work was performed using the SiC particles, there is a possibility that the torque decreased since the adaptation process of the lubricant to the surface was completed in the early stage, and the circular concavities were left on the surface.

An explanation will be given of the difference in hardening of the base material between cases in which the shot work was performed on the rollers using the needle-shaped SiC particles and in which the shot work was performed on the rollers using spherical glass (silica) particles each having a diameter of 40 μm with reference to the graphs of FIG. 9A to FIG. 9C. As shown in FIG. 9A, the hardness of the unprocessed rollers was substantially consistent with each other in any depth. Moreover, as shown in FIG. 9C, when the shot work was performed using the needle-shaped SiC particles, a change in the hardness of the sample from the unprocessed condition was hardly observed. In contrast, when the shot work was performed using the spherical glass beads, as shown in FIG. 9B, the hardness of the base material near the surface portion increased.

Figure 10:
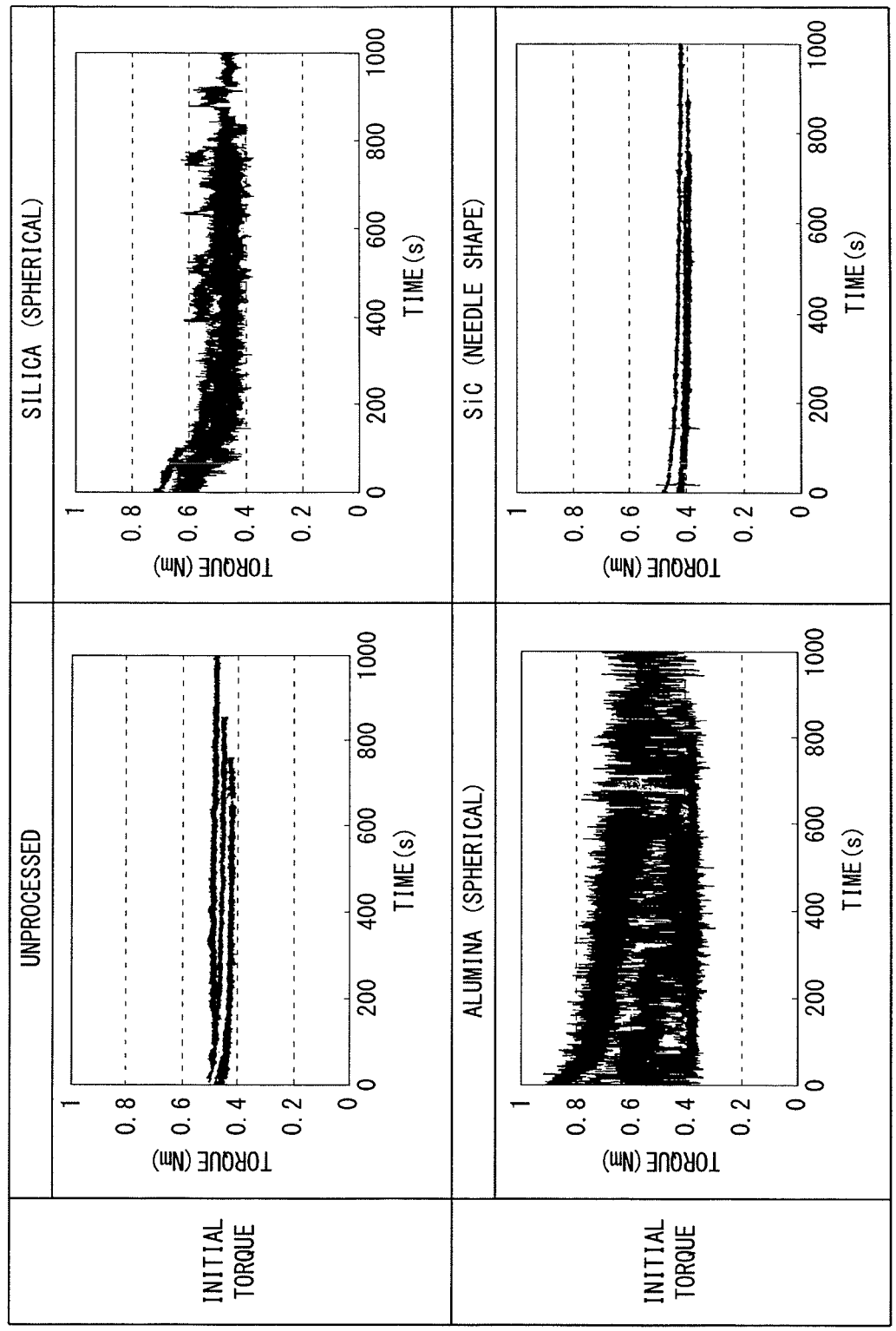
FIG. 10 is a diagram showing a measurement result of initial torque of a tapered roller bearing.

Moreover, a torque value in the break-in (initial adaptation) of the tapered roller bearing was compared among the cases in which the shot work was performed on the rollers using the needle-shaped SiC particles, in which the shot work was performed on the rollers using spherical alumina particles, and in which the shot work was performed on the rollers using the spherical silica particles. As shown in FIG. 10, when the spherical particles were used, the initial torque became large and unstable, but when the needle-shaped particles were used, the initial torque was stable which was in the same level as that of the unprocessed sample.

Furthermore, a test for anti-seizing properties was carried out using the above-explained bearings. The bearings used in the test were the test samples No. 1 and 2 in which the shot work was performed using the needle-shaped SiC particles, and the test sample No. 5 having undergone no process. Using those bearings, only several droplets of the lubricant were supplied before the test, and the bearings were rotated without any supply of the lubricant. The test time until the temperature of the outer race exceeded 100° C. was taken as a seizing time.

Figure 8:
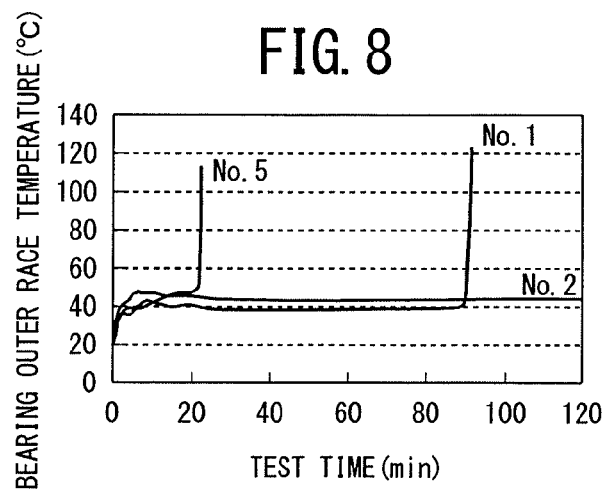
FIG. 8 is a diagram showing a test result relating to anti-seizing properties.

FIG. 8 shows the results. According to the test sample No. 5 having undergone no process, the temperature of the outer race sharply increased in about 20 minutes and the outer race was seized. However, according to the test sample No. 1 having undergone the shot work and the mirror finishing, the outer race was seized in about 90 minutes, and according to the test sample No. 2, no seizing occurred even after 120 minutes.

Still further, a lifetime test for the bearings of the tests No. 1 to 5 was carried out. It becomes clear that there is no large difference between the unprocessed sample and the sample having undergone the shot work, and the removal of the convexities like the present invention by polishing the rolling surface of the roller that is the rolling element does not negatively affect the lifetime.

According to the embodiments of the present invention, the explanation was given of the case in which the present invention was applied to only the rollers 303 of the tapered roller bearing 310. However, the present invention is not limited to such a case and the present invention can be applied to only the inner race 301 or only the outer race 302, and may be applied to equal to or greater than two of the inner race 301, the outer race 302, and the rollers 303.

Moreover, according to the embodiments of the present invention, the explanation was given of the single-row tapered roller bearing as an illustrative roller bearing of the present invention. The present invention is, however, not limited to such a kind and can be applied to other roller bearings which are used in an environment where the lubrication is not good. For example, the present invention can be applied to a back-to-back duplex tapered roller bearing or a face-to-face duplex tapered roller bearing. Moreover, the present invention can be applied to various cylindrical roller bearings, and conventionally well-known self-aligning roller bearings. Furthermore, regarding the thrust roller bearings and needle roller bearings, the similar advantages can be obtained.

Furthermore, according to the embodiments of the present invention, the SiC particles are caused to hit the base materials several times within a certain period, but the SiC particles may be caused to hit the base material only once within a short time to form interspaced circular concavities.

According to this example, the explanation was given of the example case in which the materials of the inner race 301, the outer race 302, and the rollers 303 were bearing steel (SUJ2), but ceramic, stainless-steel, or non-ferrous metal can be used. Moreover, regarding the retainer, not only metals but also resins like a high-polymer material can be used.

According to the embodiments of the present invention, a solid lubricant may be buried in the circular concavities formed by the shot work using the needle-shaped SiC particles and the mirror finishing. In this case, it is preferable to apply a work of attaching the solid lubricant to the surface by causing such a surface to be collided with the particles of the solid lubricant by high-pressure air. Moreover, when a diamond-like carbon (DLC), etc., is formed by sputtering, etc., further reduction of the torque and the wear can be expected.

According to the embodiments of the present invention, the explanation was given of the roller bearings as examples, but the present invention is not limited to such examples, and is entirely applicable to the actuators including a ball bearing, and a direct acting device, such as a linear guide, or a ball screw.

When some of respective processes, methods, and materials of the first embodiment and the second embodiment and some of the conditions of respective embodiments are changed over between the embodiments, other embodiments than the above-explained embodiment can be carried out.

REFERENCE SIGNS LIST

1 Roller bearing
2 Tapered roller
21 Large end surface
22 Small end surface
23 Rolling surface
3 Inner race
31 Large flange
32 Small flange
33 Inner-race raceway surface
4 Outer race
41 Outer-race raceway surface
5 Retainer
201 Inner race
201a Raceway surface
202 Outer race
202a Raceway surface
203 Tapered roller
203a Rolling surface
205 Flange
205a Flange face
231 Large end surface
301 Inner race
301a Inner-race raceway surface
301A, 301B Flange
302 Outer race
302a Outer-race raceway surface
303 Roller
303a Rolling surface
310 Tapered roller bearing

The invention claimed is:

1. A method for producing an actuator that comprises a rolling element and two components which move relative to each other via the rolling element, the method comprising:
shooting, at least an end surface of a roller and a counterpart surface in sliding contact with the end surface, with minute particles formed of a harder material than a material of the end surface, the minute particles each being shot at an angle that scrapes at least the end surface of the roller concavely, such that the minute particles are configured to: i) form independent, isolated and non-continuous concavities each serving as a lubricant puddle, and each having a diameter in a range of 0.5 to 100 µm, ii) set a value of three-dimensional arithmetic mean roughness (Sa) of the end surface to be equal to or greater than 0.1 µm, and iii) set a value of three-dimensional peakedness of surface height distribution (Rku or kurtosis) of the end surface to be in a range of 3 to 7, wherein
the surface concavely scraped is shot with elastic colliding materials to polish and remove convexities, the elastic colliding materials being each formed of a spherical rubber elastic material and hard particles firmly bonded to an outer circumference of the spherical rubber elastic material by a bond, the convexities being formed at respective edges of the concavities when scraping the end surface.

2. The method according to claim 1, wherein
the forming of the concavities includes providing the roller where the concavities are formed among the rolling element, and the two components relatively moving relative to each other via the rolling element are set to a holder,
the roller set to the holder is successively shot with the minute particles to form the concavities in a region of the end surface of the roller, and
the removing of the minute convexities further includes polishing, by a grindstone, the surfaces where the concavities are formed, with the roller being set to the holder to remove the minute convexities.

3. The method according to claim 1, wherein a diameter of each of the minute particles used is in a range of 0.5 to 100 µm.

4. The method according to claim 1, wherein each of the minute particles is used as a shot material, and at least the end surface is scraped by shot blasting.

* * * * *